(12) United States Patent
Smith et al.

(10) Patent No.: US 12,292,077 B2
(45) Date of Patent: May 6, 2025

(54) ADHESIVE BONDING OF BEAM AND NODE ASSEMBLIES

(71) Applicant: GM GLOBAL TECHNOLOGY OPERATIONS LLC, Detroit, MI (US)

(72) Inventors: Todd H Smith, Almont, MI (US); Joshua Solomon, Berkley, MI (US); Ethan Edward Peel Hodge, Clawson, MI (US); Joel S Hooton, Chesterfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 127 days.

(21) Appl. No.: 18/312,140

(22) Filed: May 4, 2023

(65) Prior Publication Data

US 2024/0368430 A1 Nov. 7, 2024

(51) Int. Cl.
| | |
|---|---|
| *F16B 11/00* | (2006.01) |
| *B29C 65/54* | (2006.01) |
| *F16B 39/02* | (2006.01) |
| *B29C 65/00* | (2006.01) |
| *B29C 65/48* | (2006.01) |
| *C09J 5/02* | (2006.01) |
| *C09J 5/04* | (2006.01) |

(52) U.S. Cl.
CPC .......... *F16B 39/021* (2013.01); *B29C 65/542* (2013.01); *B29C 65/483* (2013.01); *B29C 66/52* (2013.01); *C09J 5/02* (2013.01); *C09J 5/04* (2013.01); *C09J 2203/346* (2020.08); *F16B 11/006* (2013.01)

(58) Field of Classification Search
CPC ... B29C 65/542; B29C 66/1122; B29C 66/52; F16B 11/006; F16B 11/39021
See application file for complete search history.

(56) References Cited

U.S. PATENT DOCUMENTS

| | | | |
|---|---|---|---|
| 10,227,145 B2 * | 3/2019 | Hijmans | B64G 99/00 |
| 2005/0050730 A1 | 3/2005 | Marando et al. | |
| 2013/0330145 A1 * | 12/2013 | Cloud | F16B 5/02 |
| | | | 411/368 |
| 2014/0376995 A1 * | 12/2014 | Faass | F16B 11/008 |
| | | | 156/305 |
| 2016/0016229 A1 * | 1/2016 | Czinger | B22F 10/00 |
| | | | 296/205 |
| 2017/0001368 A1 | 1/2017 | Czinger et al. | |
| 2022/0066426 A1 * | 3/2022 | Czinger | G05B 19/4183 |

FOREIGN PATENT DOCUMENTS

FR 2830582 A1 * 4/2003 ........... B29C 65/485

* cited by examiner

*Primary Examiner* — Scott W Dodds
(74) *Attorney, Agent, or Firm* — Lorenz & Kopf LLP

(57) ABSTRACT

An assembly and a method are provided for manufacturing a joined assembly. A method for manufacturing includes fitting together and datuming a beam and a node, wherein at least one of the beam and the node is formed with an aperture, and wherein a cylindrical interface is formed between the beam and node. Further, the method includes advancing a mechanical fastener through the aperture to temporarily hold the beam and the node in an engagement. Also, the method includes injecting a structural adhesive into the cylindrical interface between the beam and the node. The method includes final joining the beam and the node by curing the structural adhesive.

17 Claims, 7 Drawing Sheets

ADHESIVE BONDING OF BEAM AND NODE ASSEMBLIES

The disclosure relates to beam and node assemblies, such as for forming automotive vehicle structures.

In the automotive industry, various vehicle structures may be manufactured via the connection and bonding of beams and nodes. One area of interest in improving the strength and durability of vehicle structures remains improvement in the joint strength between beams and nodes, which is essential for ensuring the safety and performance of the vehicle, while streamlining the process for forming the joint.

Traditional methods of joining beams and nodes in vehicle frames have included welding and bolting, but these methods can be time-consuming and costly, and may not always provide the necessary strength and durability. In addition, they can add weight to the vehicle, which can impact fuel efficiency and overall performance. Adhesive bonding is another known process for joining beams and nodes in the automotive industry. Adhesive bonding involves applying a bonding agent to the surface of the beam and node, and then joining them together with pressure and/or heat to create a strong, durable bond.

There is a need for new and improved methods for adhesive bonding of beam and node components, such as in automotive manufacturing. Accordingly, it is desirable to provide a cost-effective, and efficient method for adhesive bonding beams and nodes, and to provide an assembly for such methods. Furthermore, other desirable features and characteristics of the present disclosure will become apparent from the subsequent detailed description and the appended claims, taken in conjunction with the accompanying drawings and the foregoing technical field and background.

SUMMARY

An assembly and a method are provided for manufacturing a joined assembly. A method for manufacturing includes fitting together and datuming a beam and a node, wherein at least one of the beam and the node is formed with an aperture, and wherein a cylindrical interface is formed between the beam and node. Further, the method includes advancing a mechanical fastener through the aperture to temporarily hold the beam and the node in an engagement. Also, the method includes injecting a structural adhesive into the cylindrical interface between the beam and the node. The method includes final joining of the beam and the node by curing the structural adhesive.

In some embodiments of the method, injecting the structural adhesive into the cylindrical interface between the beam and the node and curing the structural adhesive forms a cylindrical cured adhesive layer.

In some embodiments of the method, one of the beam and the node is an outer member and one of the beam and the node is an inner member, fitting together and datuming the beam and the node includes fitting the inner member inside the outer member, and the outer member is formed with the aperture.

In some embodiments of the method, injecting the structural adhesive into the cylindrical interface between the beam and the node includes injecting the structural adhesive through the aperture.

In some embodiments of the method, injecting the structural adhesive through the aperture includes injecting the structural adhesive through the mechanical fastener.

In some embodiments of the method, the aperture is a first aperture, the at least one of the beam and the node is formed with a second aperture, and injecting the structural adhesive into the cylindrical interface between the beam and the node includes injecting the structural adhesive through the second aperture.

In some embodiments of the method, final joining the beam and the node by curing the structural adhesive is performed at ambient temperature and forms a joined article, and the method further includes: pre-coating the node and the beam before fitting together and datuming the node and the beam; and assembling a structure from the joined article without coating the joined article.

In some embodiments, the method further includes locating a high surface area substrate between the beam and node, injecting the structural adhesive into the cylindrical interface between the beam and the node includes flowing the structural adhesive into contact with the high surface area substrate, and final joining the beam and the node by curing the structural adhesive includes curing the structural adhesive around the high surface area substrate.

In some embodiments of the method, a surface of at least one of the beam and node is formed with a flow path, and the method includes flowing the structural adhesive through the flow path.

In some embodiments of the method, a surface of at least one of the beam and the node is formed with a first flow path and a second flow path, the structural adhesive is injected in the form of a two-part adhesive including a first part and a second part, and the method includes flowing the first part through the first flow path and the second part through the second flow path to mix the first part and the second part.

In another embodiment a method for manufacturing is provided and includes fitting together and datuming a beam and a node, wherein at least one of the beam and the node is formed with an aperture, and wherein a cylindrical interface is formed between the beam and the node; fixturing the beam and the node to temporarily hold the beam and the node in a desired orientation and position relative to one another; injecting a structural adhesive through the aperture into the cylindrical interface between the beam and the node; and final joining the beam and the node by curing the structural adhesive.

In some embodiments of the method, injecting the structural adhesive into the cylindrical interface between the beam and the node and curing the structural adhesive forms a cylindrical cured adhesive layer.

In some embodiments of the method, one of the beam and the node is an outer member and another of the beam and the node is an inner member, fitting together and datuming the beam and the node includes fitting the inner member inside the outer member, and the outer member is formed with the aperture.

In some embodiments of the method, final joining the beam and the node by curing the structural adhesive is performed at ambient temperature and forms a joined article, and the method further includes: pre-coating the node and the beam before fitting together and datuming the node and the beam; and assembling a structure from the joined article without coating the joined article.

In some embodiments, the method further includes locating a high surface area substrate between the beam and the node, injecting the structural adhesive into the cylindrical interface between the beam and the node includes flowing the structural adhesive into contact with the high surface area substrate, and final joining the beam and the node by curing the structural adhesive includes curing the structural adhesive around the high surface area substrate.

In some embodiments of the method, a surface of at least one of the beam and the node is formed with a flow path, and the method includes flowing the structural adhesive through the flow path.

In some embodiments of the method, a surface of at least one of the beam and the node is formed with a first flow path and a second flow path, the structural adhesive is injected in the form of a two-part adhesive including a first part and a second part, and the method includes flowing the first part through the first flow path and the second part through the second flow path to mix the first part and the second part.

In another embodiment, an assembly for manufacturing a joined assembly is provided and includes: a structural adhesive; a beam; a node, wherein the beam and the node are configured to be fitted together and form an interface therebetween, and wherein at least one of the beam and the node is formed with an aperture; and a mechanical fastener configured to be received in the aperture and to initially fixture the beam and the node, wherein the mechanical fastener is formed with a channel configured to deliver the structural adhesive to the interface between the beam and the node.

In some embodiments, the assembly further includes a high surface area substrate configured to be located at the interface between the beam and the node, and configured to bond to the structural adhesive.

In some embodiments of the assembly, a surface of at least one of the beam and the node is formed with a flow path configured to direct the structural adhesive along the interface.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description.

Spatially relative terms, such as "front", "rear", "above", "below", "behind" "top", "bottom", "under", "over", "side", and the like, may be used herein for ease of description to describe one element or feature's relationship to another element(s) or feature(s) as illustrated in a figure or figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1:
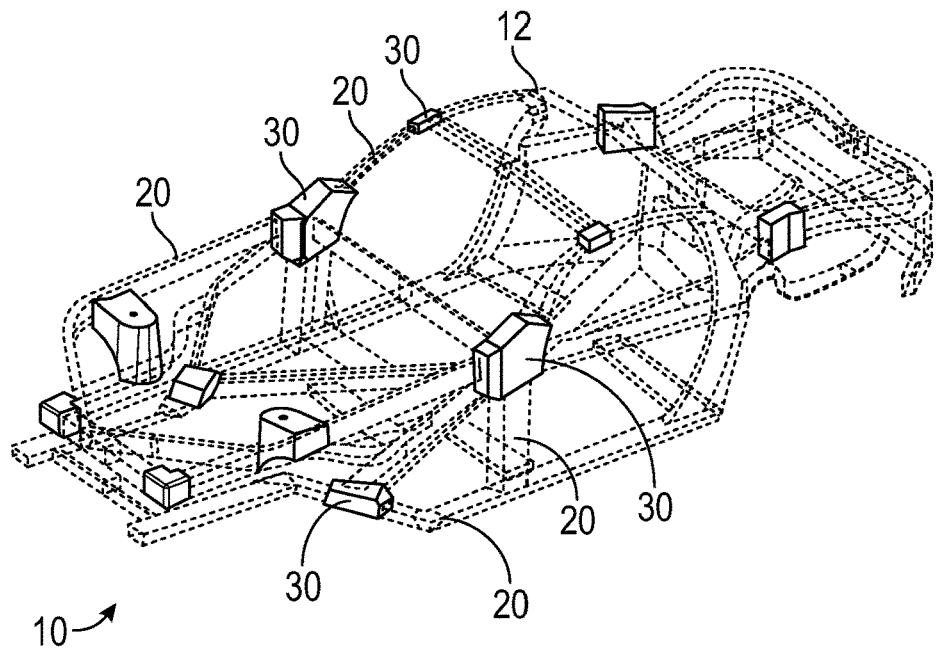
FIG. 1 is a perspective view schematic of a vehicle structure manufactured with beam and node assembly, in accordance with exemplary embodiments.

Referring to FIG. 1, a vehicle 10 is illustrated. Specifically, in FIG. 1., the exterior body panels are removed and the various systems, including the engine system, transmission system, suspension system, steering system, brake system, electrical system, fuel system, exhaust system, and vehicle interior are not shown so that features of the vehicle chassis and/or frame are clearly illustrated.

In various embodiments, the vehicle 10 is an automobile. The vehicle 10 may be any one of a number of different types of automobiles, such as, for example, a sedan, a wagon, a van, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 10 may also include another type of mobile platform.

As shown, the frame 12 is formed from beams 20 and nodes 30. Nodes 30 are defined as a vertex in a structural load path, such as where beams 20 are connected. Exemplary nodes 30 may be fabricated via casting, stamping, machining, three-dimensional printing (3D printing) or additive manufacturing, or other suitable processes.

Beams 20 may be any linear or curved structural element, such as a rod, pillar, post, strut, tie-bar, tube, or similar structure. In exemplary embodiments, a beam 20 may connect two or more nodes 30 in a structural load path. Further, an exemplary beam 20 may be fabricated via roll forming, extrusion, stamping, three-dimensional printing (3D printing) or additive manufacturing, or other suitable processes.

Described herein is a method for joining beams 20 and nodes 30. Specifically, methods herein enable self-locating components for assembly between structural beam 20 and node 30 elements, without use of outside datums. In manufacturing, a datum is a specific point, line, or plane that is used as a reference for the dimensional measurement and positioning of other parts or features. In the context of fixturing beams 20 and nodes 30 during an assembly process, the datum may be is usually a point, line, or plane on the beam 20 and/or node 30 that is used as a reference to position and align the beams and nodes correctly. Use of a datum ensures that the beams 20 and nodes 30 parts are consistently and accurately positioned during assembly, which helps to improve the quality and efficiency of the manufacturing process.

Thus, the process of aligning and positioning two articles relative to each other during manufacturing is called "datuming", and it involves the use of datum features or datum surfaces on the beams 20 and nodes 30 themselves, rather than on an assembly device or other structure that is not being joined.

In some embodiments, a method described herein enables beams 20 and nodes 30 to be fixtured and datumed prior to final joining. During assembly of parts, fixturing refers to the process of holding and positioning the parts in a specific orientation or location using specialized devices called fixtures. Fixturing helps to ensure that the parts are assembled correctly and consistently. Fixtures can be designed to hold the parts in a specific orientation, to provide support during assembly, or to apply pressure or force to specific areas of the parts to ensure proper fit and alignment.

It is noted that fixturing does not provide a final joining between the beam and node. Rather, fixturing is a quick and easy method to temporarily hold the beam and node together at a desired relationship while no undesired external stresses are applied to the beam and node.

In some embodiments, beam-to-node fixturing is accomplished by use of a mechanical fastener, such as a set screw, self-piercing rivet, flow drill screw, bolt, or other suitable fastening structure. Additionally or alternatively, beam-to-node fixturing may be accomplished by use of compliant parts such as elastomers, including O-rings, seals, bushing, or other suitable elastomeric fasteners. Compressing elastomeric fasteners may cause a mechanical fastening when the elastomeric exerts an elastic restoring force against the compression.

In embodiments described herein, final joining is accomplished through the use of structural adhesive that secures the beam(s) and node(s) in the assembly. In exemplary embodiments, the structural adhesive cures at ambient temperature, i.e., is "no-bake cure adhesive". Therefore, embodiments herein may be utilized with precoated beams and nodes, such as anodized, powder-coated, or painted beams and nodes. After the final joining process, no further anodizing, coating, or painting process is needed for the joined assembly including the beam and node. In the manufacturing process, this eliminates the requirement of using a paint shop after the final joining process.

Figure 2:
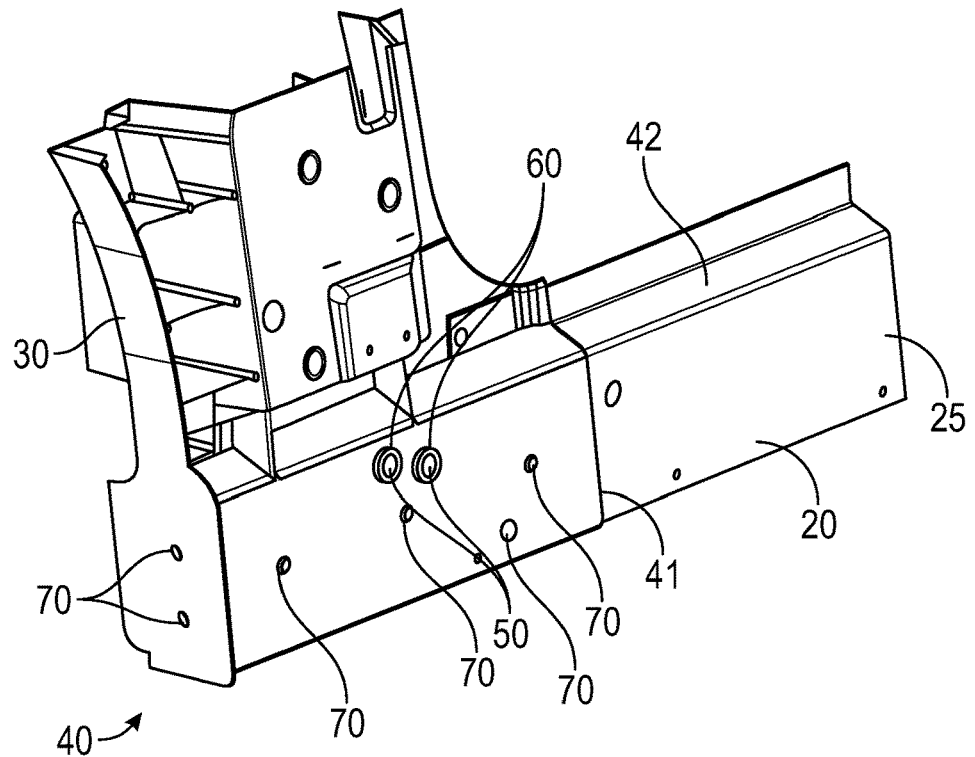
FIG. 2 is a perspective view schematic of a joined assembly of a beam and a node, such as in the vehicle structure of FIG. 1, in accordance with exemplary embodiments.

Referring to FIG. 2, a perspective view schematic of a joined assembly 40 formed from a beam 20 and a node 30 joined at an interface 41, such as in the vehicle of FIG. 1, in accordance with exemplary embodiments.

In certain embodiments, the node 30 may be a manifold such as is used in complex structural systems where multiple beams converge at a single point. The manifold may act as a hub or junction for the beams to connect, allowing forces to be distributed efficiently across the structure. In FIG. 2, the node 30 is a hinge pillar that is formed as a one-piece, unitary, i.e., monolithic, structure. Such a node 30 may replace a hinge pillar formed from multiple stampings, tubes, screws, nuts, and layers of adhesive. In exemplary embodiments, the node 30 is formed from steel, aluminum, or cast iron or other suitable material, depending on the specific application and structural requirements.

In FIG. 2, the beam 20 is a hollow semi-rectangular tube with a distal portion (hidden by the node 30) having a reduced outer dimension to be received within the node 30. As shown, the non-inserted portion 25 of the beam 20 has an outer dimension equal to the outer dimension of the node 30, such that the joined assembly 40 is formed with a continuous external surface 42.

The node 30 is formed with at least one aperture 50. Specifically, the node 30 is formed with two apertures 50.

As further shown, the joined assembly 40 includes a mechanical fastener 60 received in each aperture 50. In the illustrated embodiment, the mechanical fastener 60 is a set screw. In exemplary embodiments, the aperture 50 and fastener 60 are formed with mating features, such as threads, to enable the fastener 60 to be advanced and tightened in the aperture 50. In certain embodiments, the fastener 60 may advance into contact with the outer surface of the distal portion of the beam 20. In other embodiments, the beam 20 itself may include an aperture that is aligned with aperture 50 such that the fastener 60 advances through the beam 20, such as when using a bolt and nut as the fastener 60. In either case, the fastener 60 temporarily holds or locks the relative position of the node 30 and beam 20 before adhesive is injected into the interface 41 to form a permanent bond in final joining.

As shown in FIG. 2, the node is formed with apertures 70. Apertures 70 are optional depending on the design of the beam 20 and node 30 and the interface 41 therebetween, as well as depending on the required structural strength of the bond in the joined assembly 40. In FIG. 2, the apertures 70 are provided as injection ports for injecting or flowing structural adhesive into the interface between the beam 20 and the node 30. In certain embodiments, optional apertures 70 may be formed in the node 30 to allow air to flow out of the interface 41 to improve adhesive flow therein, and/or to allow adhesive itself to flow out of the interface 41 to achieve desired wet-out of the adhesive.

As described below, apertures 70 are optional because, in certain embodiments, apertures 50 are used both for receiving mechanical fasteners 50 and as injection ports for adhesive.

In FIG. 2, the beam 20 is an inner member and the node is an outer member. As the inner member, a portion of the beam 20 is fitted inside the node 30. Also contemplated are embodiments in which the beam 20 is the outer member and the node 30 is the inner member, such that a portion of the node 30 is received and fitted within the beam 20. In either case, it is contemplated that at least the outer member be formed with aperture(s) 50 and, optionally, aperture(s) 70 to facilitate temporary fastening and final joining of the beam 20 and node 30.

Figure 3:
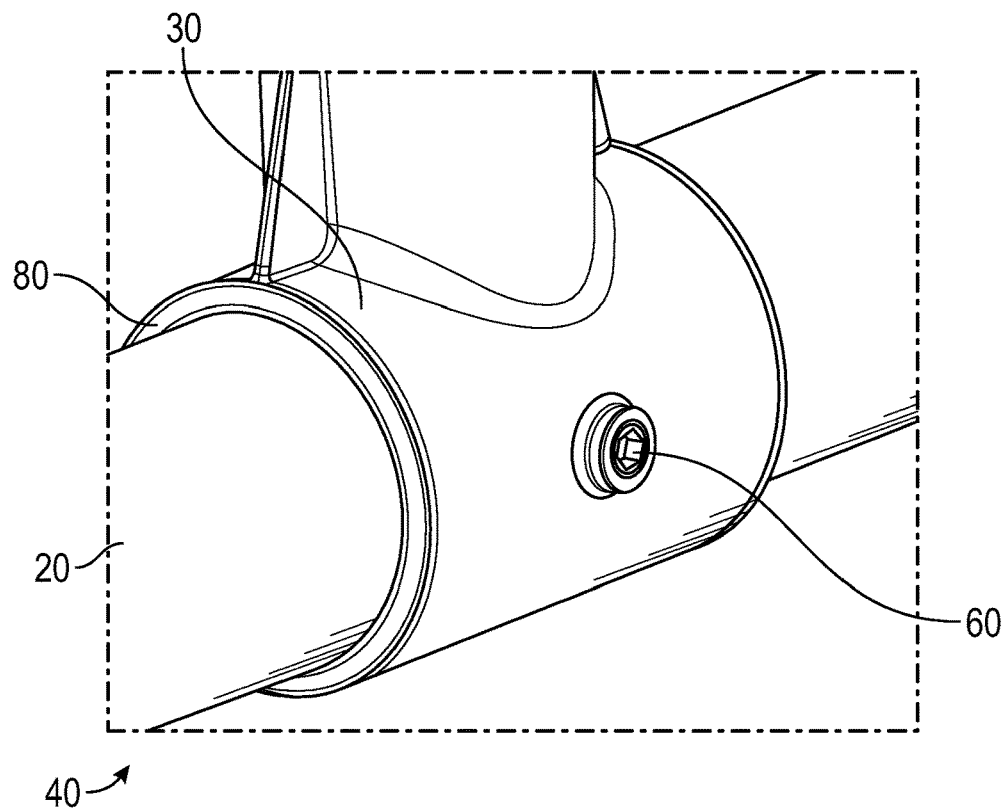
FIG. 3 is a perspective view schematic of a joined assembly of a beam and a node, such as in the vehicle structure of FIG. 1, in accordance with exemplary embodiments.
Figure 4:
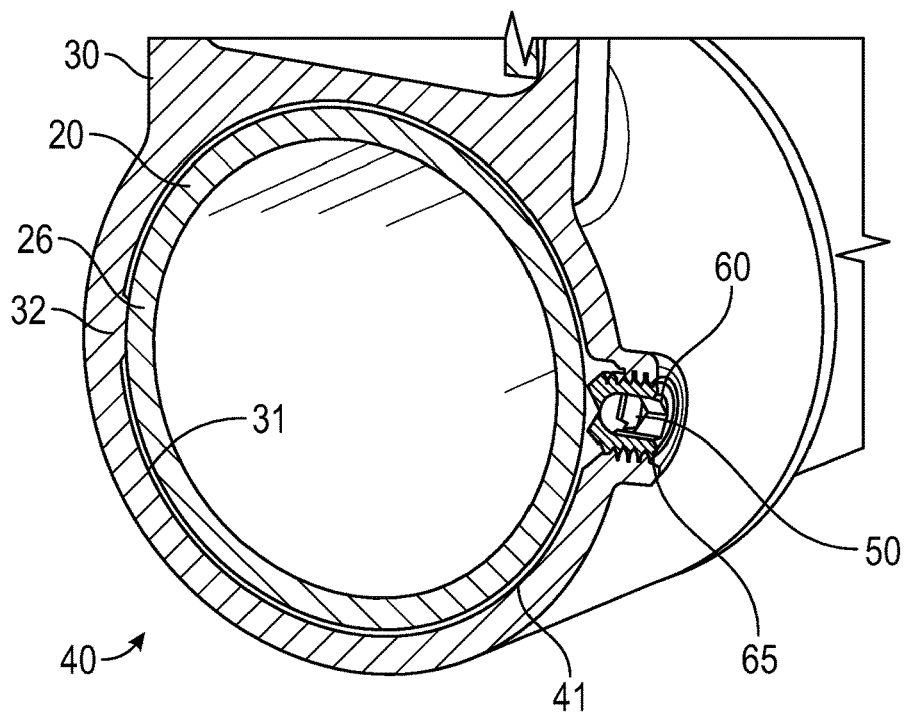
FIG. 4 is a cross-sectional perspective view schematic of the joined assembly of FIG. 3, taken along a plane through the mechanical fastener, in accordance with exemplary embodiments.

FIGS. 3 and 4 illustrate another embodiment of a joined assembly 40. FIG. 3 is a perspective view of a joined assembly 40 of a node 30 and beam 20. FIG. 4 is a cross-sectional perspective view schematic of the joined assembly 40 of FIG. 3, taken along a plane through the mechanical fastener 60, and illustrating the inserted portion 26 of the beam 20 within the node 30.

Cross-referencing FIGS. 3 and 4, the beam 20 and node 30 are fixtured and held together by a mechanical fastener 60 and by an elastomeric element 80, such as a rubber or nylon gasket. The elastomeric elements 80 may bound an interface cavity formed between the beam 20 and node 30, such that adhesive injected therein is prevented from flowing out from the elastomeric elements 80.

As shown, the aperture 50 and fastener 60 are threaded and engage in a mating relationship such that the fastener 60 may be advanced into the aperture 50 by applying a rotational force to the head of the fastener 60. When advanced into the aperture 50, the distal end of the fastener 60 contacts and exerts a force against the beam 20. In certain embodiments, the inner surface 31 may be formed with a raised nodule 32 or mesa feature that extends inward from the rest of the inner surface 31. The raised nodule 32 may counteract the force exerted onto the beam 20 by the fastener 60 to prevent the fastener 60 from pushing the beam 20 out of an axial alignment with the node 30.

Figure 5:
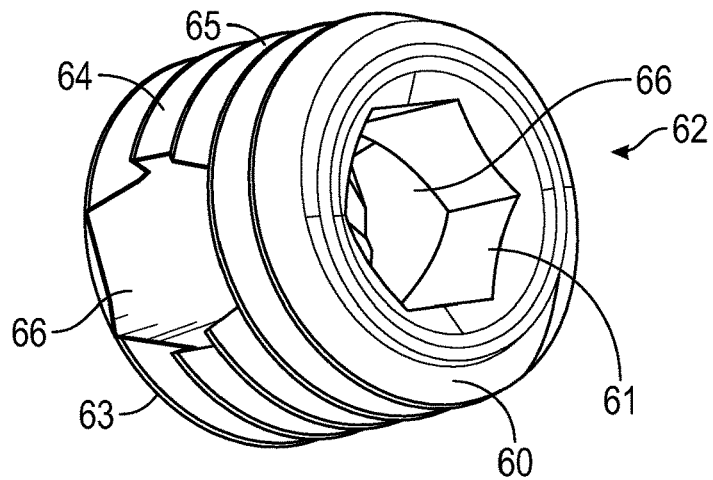
FIG. 5 is a perspective detailed view of an exemplary fastener of a joined assembly, in accordance with exemplary embodiments.

FIG. 5 provides a perspective detailed view of an exemplary fastener 60. As shown, the head of fastener 60 is formed with a selected keyway 61 having a design such as a hex, star, or the like, for receiving a tool with a mating distal end for engagement with the fastener 60. The keyway design configuration can be selected based on engineering or supplier requirements.

The keyway 61 forms or is in communication with an opening or internal void 62. In exemplary embodiments, the internal void 62 does not extend through the fastener 60 such that a distal end 63 of the fastener 60 bounds the internal void 62.

As further shown, the fastener 60 has a generally cylindrical wall 64 that is formed with threads 65 for mating with the aperture 50. Also, the fastener 60 is formed with ports 66 that extend through the wall 64. Thus, the ports 66 are in fluid communication with the internal void 62 and the keyway 61.

Figure 6:
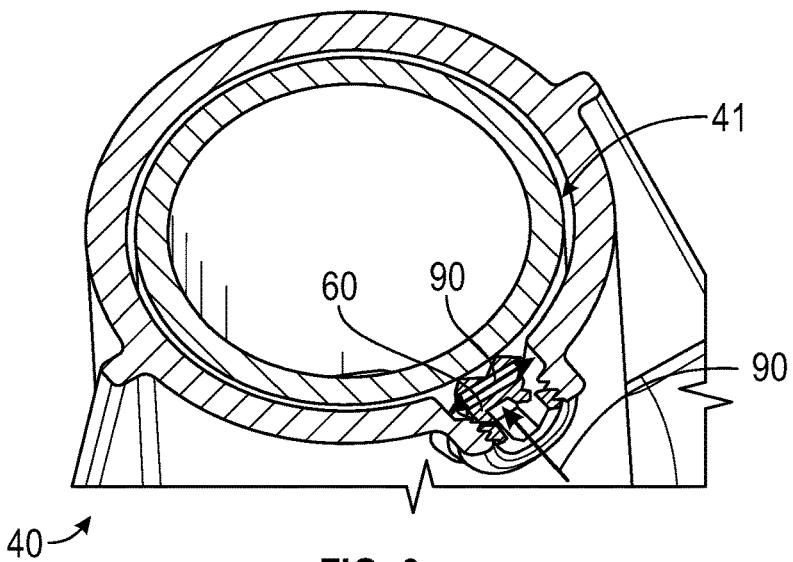
FIG. 6 is a cross-sectional perspective view schematic of a joined assembly, taken along a plane through the mechanical fastener similar to FIG. 3, in accordance with exemplary embodiments.

FIG. 6 provides a cross-sectional perspective view schematic of a joined assembly 40 with further description regarding the injection of adhesive 90 into the interface 41 between the beam 20 and the node 30. As shown, the interface 41 has a generally cylindrical shape. While FIG. 6 illustrates an interface 41 with a circular cylindrical shape, it is contemplated that the interface 41 may have a rectangular, square, oval, round, hexagon, heptagon, octagon, or other polygonal shape, or a non-polygonal cylindrical shape such as may be envisioned for the assembly 40 of FIG. 2. As used herein, cylindrical is used to refer to the interface 41 being endless, like a ring. As indicated above in relation to FIG. 3, elastomeric elements 80 may bound the lateral ends of the interface 41.

In FIG. 6, a flow path of adhesive 90 is illustrated. Cross-referencing FIGS. 5 and 6, the adhesive 90 is injected through the keyway 61 and internal void 62 and out of the ports 66 into the interface 41. The structural adhesive 90 may flow through and fill the interface 41. Excess adhesive 90 may exit through optional apertures if provided, or internally in the joined assembly 40.

Figure 7:
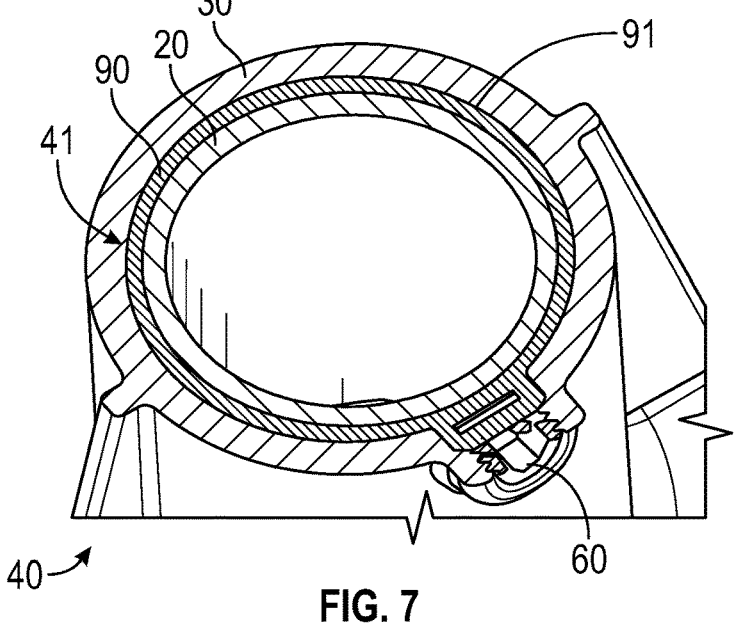
FIG. 7 is the cross-sectional perspective view schematic of FIG. 6 after adhesive is injected and cured, in accordance with exemplary embodiments.

In FIG. 7, the adhesive 90 has cured into a cylindrical adhesive layer 91 that fills the interface 41 and bonds the beam 20 and the node 30. As shown, the distal portion of the fastener 60 may be bonded within the cured adhesive layer 91. In exemplary embodiments, the adhesive 90 is cured into the adhesive layer 91 at ambient temperature. Because curing occurs at ambient temperature, the joining process described herein does not include any high temperature process that would damage coatings. Therefore, methods herein allow for pre-coating the node and the beam before fitting together and for assembling a structure from the joined article without applying any coating to the joined article after final joining, such as via an electrodeposition primer dip tank or paint shop.

Figure 8:
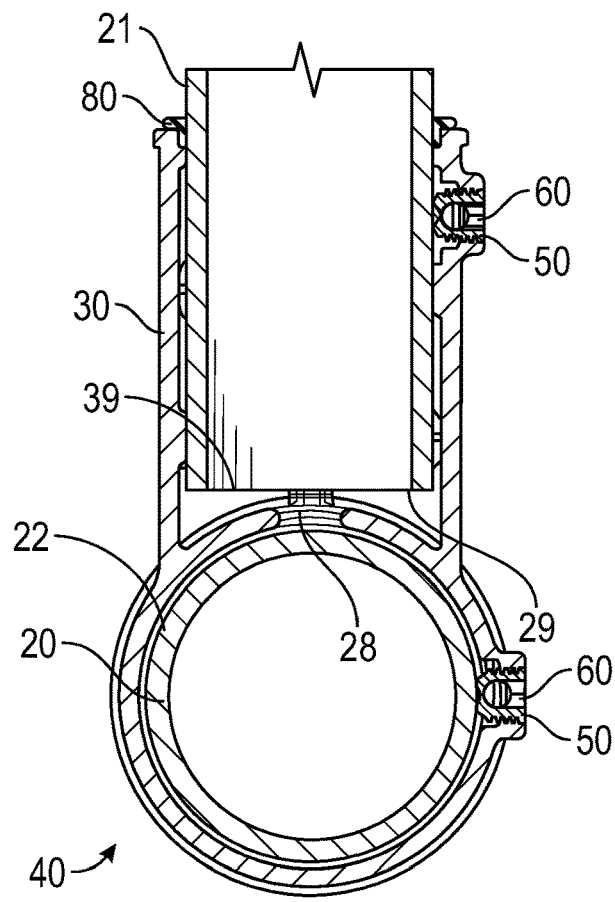
FIG. 8 is a cross-sectional view schematic of another embodiment of a joined assembly, in accordance with exemplary embodiments.
Figures 9, 10:
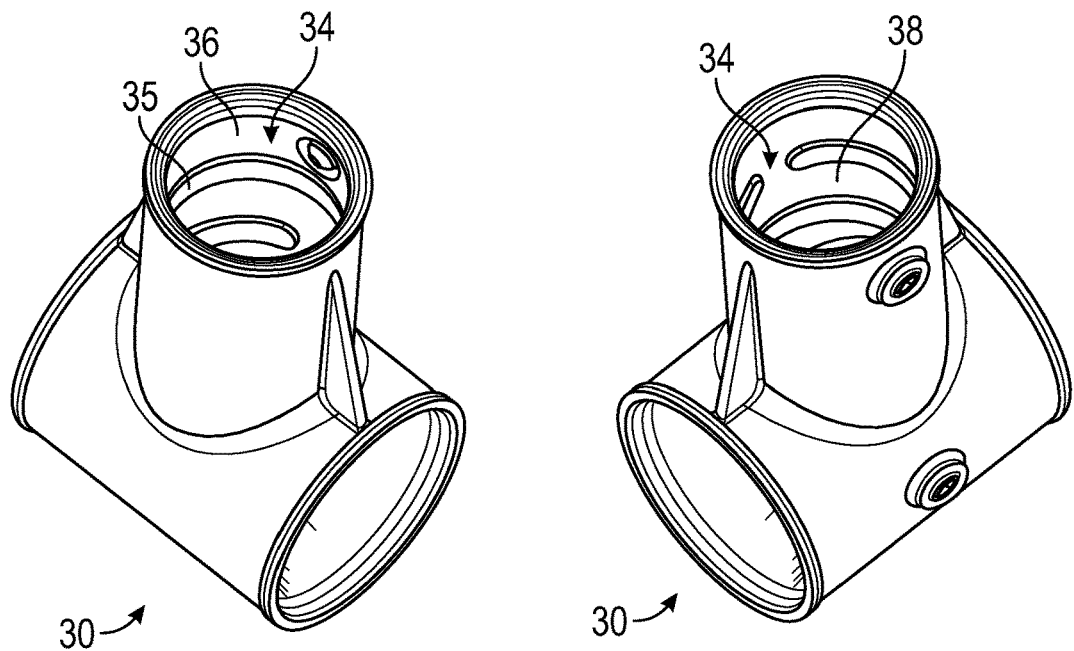
FIGS. 9 and 10 are perspective views of the node of the joined assembly of FIG. 8.

FIGS. 8-10 illustrate other features of an exemplary joined assembly 40. FIG. 8 is a cross-sectional view of a T-shaped node 30 that receives two beams 20, i.e., vertical beam 21 and horizontal beam 22. The node 30 is formed with an aperture 50 for receiving a fastener 60 to independently fixture each beam 21, 22.

In FIG. 8, the node 30 is formed with an internal structure 39 that abuts distal end 29 of beam 21. Thus, internal structure 39 and distal end 29 serve as datuming features for proper alignment of beam 21 and node 30. Specifically, the distal end 29 of beam 21 is fitted into the node 30 until the distal end 29 contacts the internal structure 39. The distal end 29 and internal structure 39 may be further designed to engage when beam 21 is rotated. For example, distal end 29 and internal structure 39 may be formed with engaging teeth or other design. As a result, the beam 20 and node 30 themselves include datuming features for aligning and positioning the beam 20 and node 30 in position relative to one another before fixturing. Thereafter, the fastener 60 may be advanced through the aperture 50 to temporarily lock and hold the beam 20 and node 30 in position relative to one another before final joining.

Also, FIG. 8 illustrates that the node 30 may be formed with a hole 28. Hole 28 may receive excess adhesive from the interface with beam 21 and/or from the interface with beam 22.

FIGS. 9 and 10 illustrate a further feature of the exemplary node 30 of FIG. 8. As shown, the inner surface 33 of the node is formed with a flow path 34 configured to direct the structural adhesive along the interface. Specifically, raised portions 35 of the inner surface 33 abut the outer surface of the beam 20 received therein such that the flow path 34 is a channel defined between the outer surface of the beam 20 and the non-raised portions 36 of the inner surface 33 of the node 30. The flow path 34 structure may be designed to facilitate flow of the adhesive 90 to hard-to-reach areas and may be designed with consideration of gravity forces, viscous drag, pressure gradient, inertial forces, surface tension, electrostatic forces, or other forces.

Further, the inner surface 33 may be formed with two flow paths, flow path 34 and flow path 38, as shown in FIG. 10. Each flow path may be dedicated to a respective port 66 of the fastener (FIG. 5). Thus, when a two-part adhesive 90 is injected in two parts, one part may flow through flow path 34 and the other part may flow through flow path 38. Such flow paths 34 and 38 may be designed to provide for mixing of the two parts of the two-part adhesive. For example, the two flow paths 34 and 38 may be helical and interleaved, with openings between the two flow paths 34 and 38 circumferentially spaced.

Figure 11:
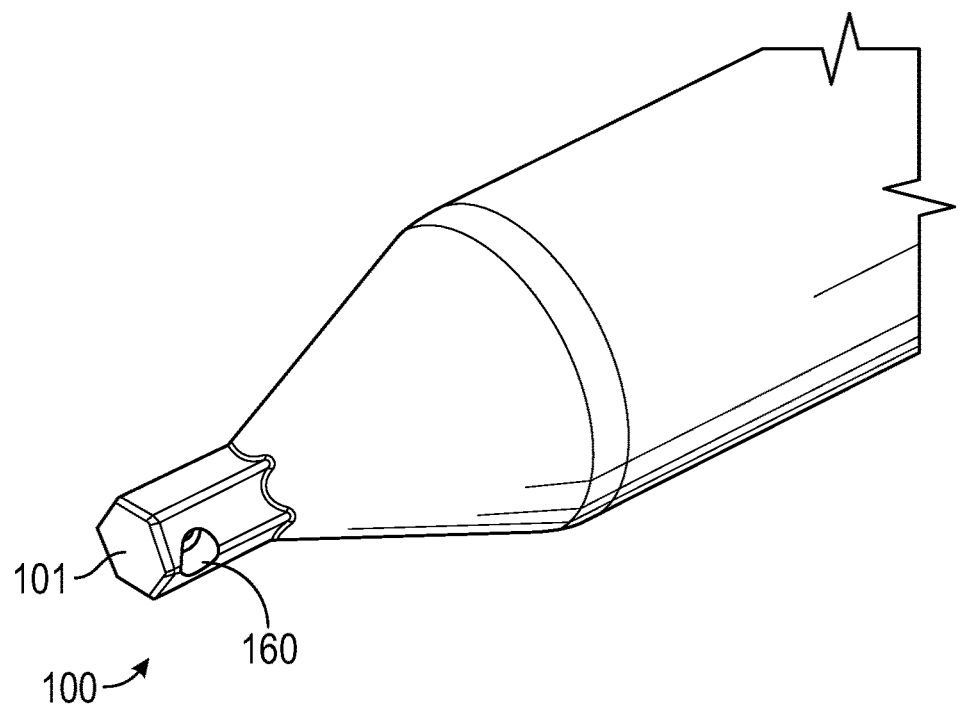
FIG. 11 is a perspective view of a tool for fixturing and injecting adhesive, in accordance with exemplary embodiments.
Figure 12:
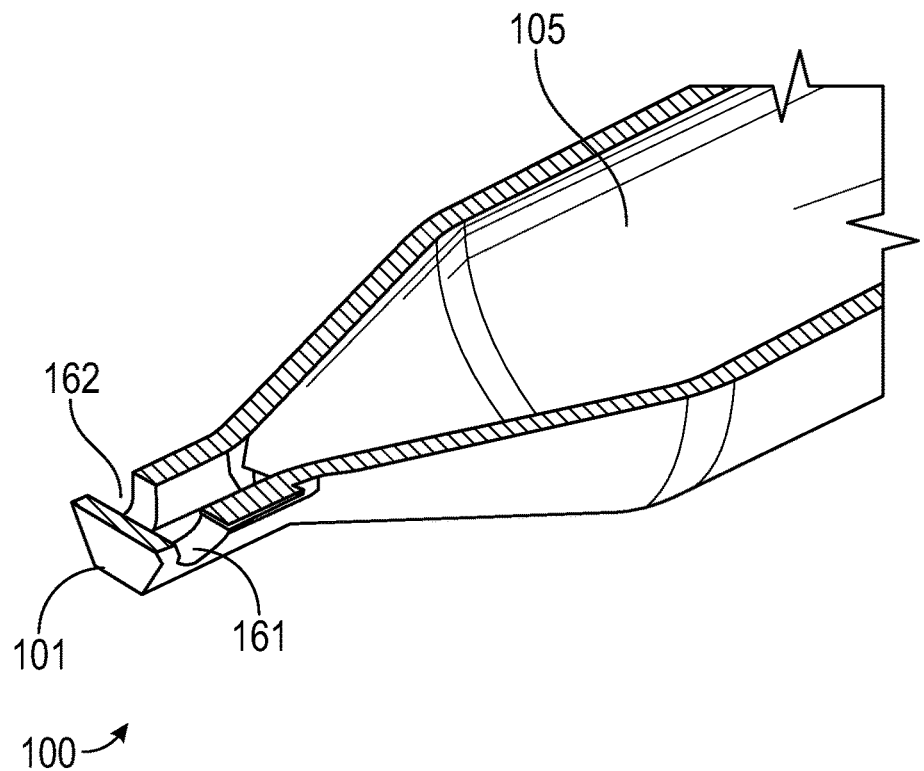
FIG. 12 is a cross-sectional perspective view of the tool of FIG. 11.

FIGS. 11 and 12 illustrate the distal end 101 of a tool 100 for advancing the fastener 60 into the aperture 50 and for injecting adhesive 90 into the interface between the beam and node. FIG. 11 is a perspective view and FIG. 12 is a lateral cross-sectional view. As shown, the distal end 101 is formed with a reciprocal shape for use with the keyway 61 of the fastener 60. Further, the tool is formed with ports 160 adjacent the distal end 101. Ports 160 may be formed as two separate ports 161 and 162 for delivering two previously separated parts of a two-part adhesive composition.

In an exemplary embodiment, the distal end 101 of the tool 100 is located in the keyway 61 of the fastener 60. In certain embodiments, the keyway 61 and the distal end 101 of the tool 100 may be designed such that the distal end 101 can be inserted into the keyway 61 only when insertion results in alignment of ports 160 of the tool 100 with ports 66 in the fastener 60.

After the tool 100 is inserted, the tool 100 is rotated to cause the fastener 60 to advance into the threaded aperture 50 of the node 30. After the fastener 60 is advanced to the correct distance, or as far as possible, the ports 160 and ports 66 may be aligned with the interface, such as with a desired flow path in the interface 41. Then, the adhesive 90 may be injected through the tool 100 and into the interface. For two-part adhesives 90 that are mixed within the interface 41, the tool 100 may be enabled to control the flow rate of each part of the two-part adhesive for appropriate mixing.

Figure 13:
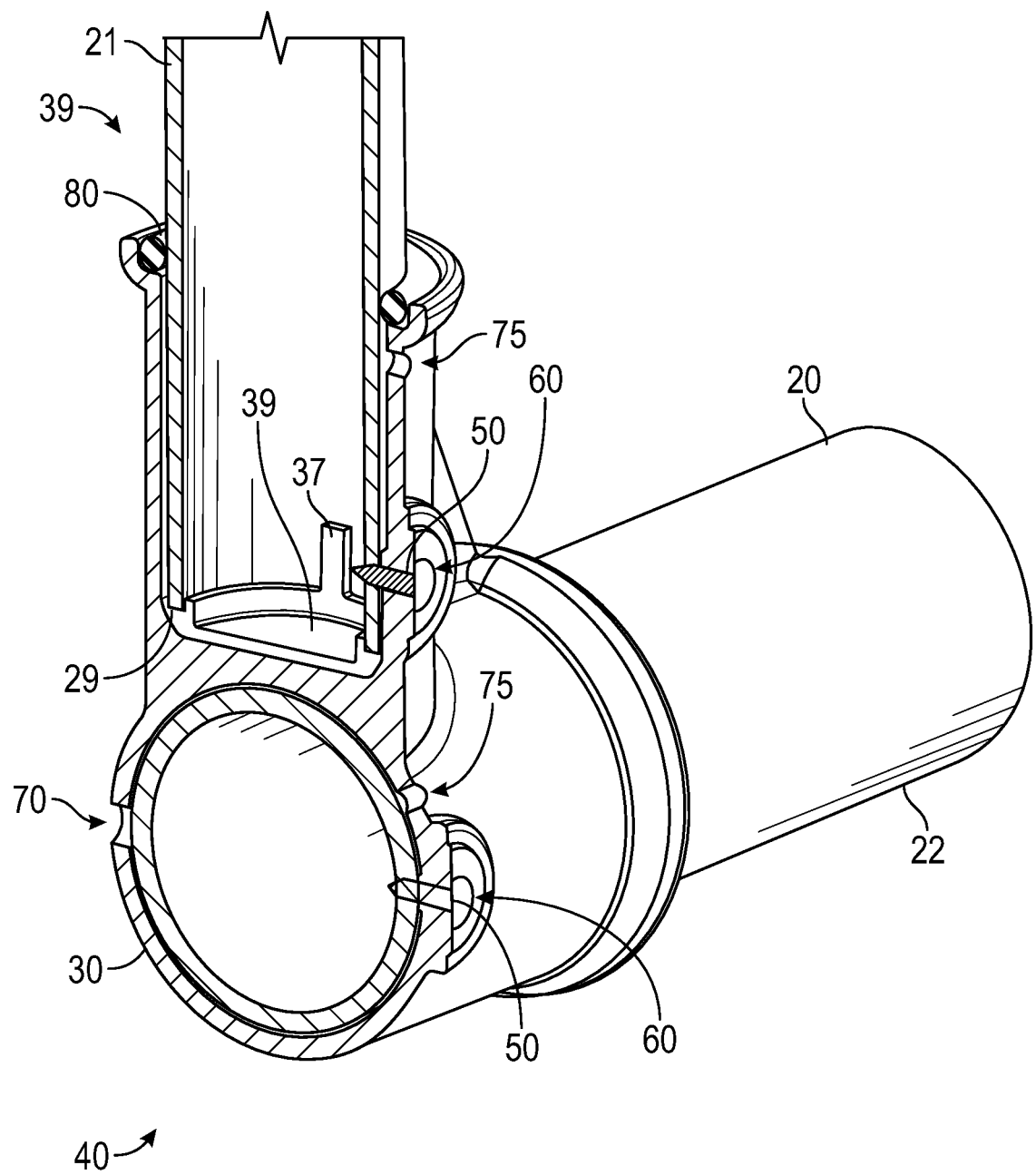
FIG. 13 is a cross-sectional perspective view schematic of another embodiment of a joined assembly, in accordance with exemplary embodiments.

FIG. 13 illustrates another embodiment of a joined assembly 40. FIG. 13 is a cross-sectional perspective view of a T-shaped node 30 that receives two beams 20, i.e., vertical beam 21 and horizontal beam 22. The node 30 is formed with an aperture 50 for receiving a fastener 60 to independently fixture each beam 21, 22. In the embodiment of FIG. 13, fasteners 60 are commercially available, such as RIVTAC® brand fasteners, and do not include internal voids or ports. Therefore, node 30 is formed with additional apertures 70 that are dedicated to injecting adhesive, i.e., that do not receive fasteners. As shown, node 30 may further be formed with air evacuation ports 75 that allow air to escape the interface 41 when adhesive is injected into the interface 41.

In FIG. 13, the node 30 is formed with an internal structure 39 that abuts the distal end 29 of beam 21. Thus, internal structure 39 and distal end 29 serve as datuming features for proper alignment of beam 21 and node 30. Specifically, the distal end 29 of beam 21 is fitted into the node 30 until the distal end 29 contacts the internal structure 39. As shown, the internal structure 39 may include a tapered alignment guide or projection 37. The distal end 29 of the beam 21 may be formed to fit around the projection 37, thus ensuring proper alignment between the beam 21 and node 30. Thus, internal structure 39 and distal end 29 serve as datuming features for proper alignment of beam 21 and node 30. Specifically, the distal end 29 of beam 21 is fitted into the node 30 until the distal end 29 contacts the internal structure 39. As a result, the beam 20 and node 30 themselves include datuming features for aligning and positioning the beam 20 and node 30 in position relative to one another before fixturing. Thereafter, the fastener 60 may be advanced through the aperture 50 to temporarily lock and hold the beam 20 and node 30 in position relative to one another before final joining by injecting adhesive through apertures 70.

Figure 14:
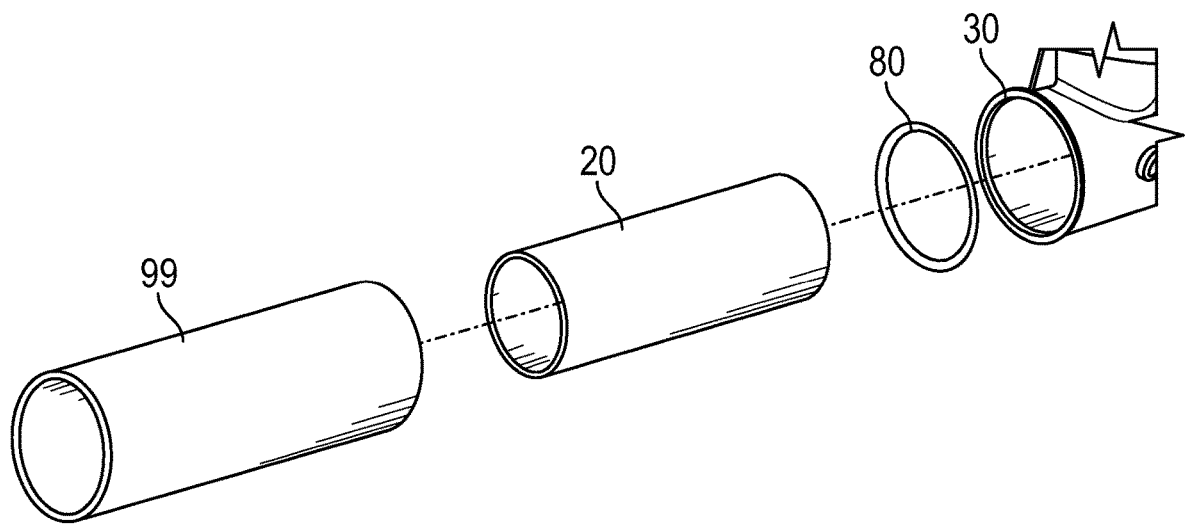
FIG. 14 is an exploded perspective view of another embodiment of a joined assembly, in accordance with exemplary embodiments.

FIG. 14 provides an exploded view of another embodiment of a joined assembly 40. Similar to the embodiments above, the assembly 40 includes a beam 20, a node 30, and an elastomeric element 80. Further, the embodiment of FIG. 14 includes a high surface area substrate 99. For example, the high surface area substrate 99 may be porous, woven, or formed by fibers. In exemplary embodiments, the substrate 99 may have a surface area that is ten times greater or one hundred times greater than a surface area of a similar structure formed with a smooth surface. The high surface area substrate 99 may generally have the same shape as the beam, but may be sized slightly larger.

When forming the joined assembly, the high surface area substrate 99 is located between the beam 20 and the node 30, i.e., at the interface. When adhesive is injected into the interface, the adhesive surrounds and bonds to the high surface area substrate 99 while bonding to the beam 20 and the node 30. Thus, the adhesive 90 and the high surface area substrate 99 are formed as part of the cured adhesive layer 91 (see FIG. 7).

Figure 15:
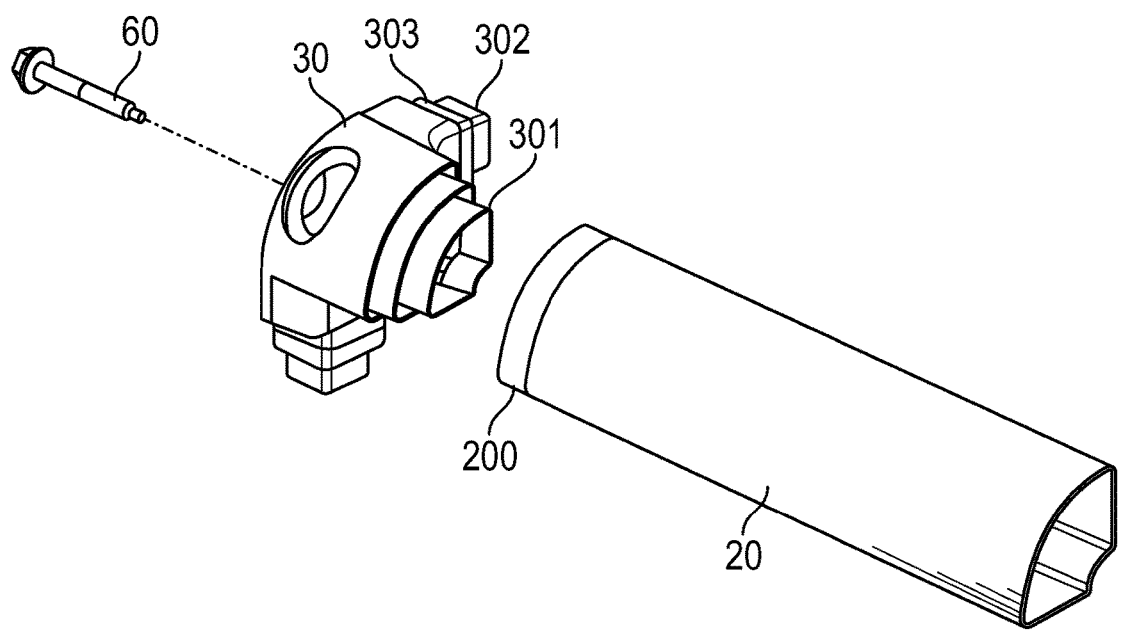
FIG. 15 is an exploded perspective view of another embodiment of a joined assembly, in accordance with exemplary embodiments.

FIG. 15 provides an exploded view of another embodiment of a joined assembly 40. In FIG. 15, the node 30 is designed for use with beams 20 of different sizes. As shown, the node 30 includes an insertion end 301, formed with a tiered outer diameter. For example, a distal portion 302 has a smaller dimension configured for attachment to a beam 20 having a larger dimension, and an intermediate portion 303 has a larger dimension configured for attachment to a beam 20 having a larger dimension.

In the embodiment of FIG. 15, the node 30 is the inner member and the beam 20 is the outer member. Further, assembly 40 may include an end cap 200 that includes at one end a portion with a reduced dimension to fit inside the beam 20 and that, at the other end, fits over the insertion end 301 of the node 30. For example, the end cap 200 may be formed for friction fit engagement with the beam 20 and with the node 30.

In the illustrated design, fastener 60 may be advanced through aperture 50 in the node 30 and through an aperture (not show) in the end cap 200 to fasten the beam 20 and node 30 before final joining.

In view of FIGS. 1-15, a method for manufacturing, such as for manufacturing a vehicle component, is described and includes fitting together and datuming a beam 20 and a node 30. At least one of the beam 20 and the node 30 is formed with an aperture 50. The method may include advancing a mechanical fastener 60 through the aperture 50 to temporarily hold the beam 20 and the node 30 in an engagement, i.e., fixturing the beam 20 and node 30. Then, the method includes injecting a structural adhesive 90 into the cylindrical interface 41 between the beam 20 and the node 30. The method includes final joining the beam 20 and the node 30 by curing the structural adhesive 90 to form a cylindrical adhesive layer 91. In certain embodiments, the method may include pre-coating the node and the beam before fitting together and datuming the node and the beam; and assembling a structure from the joined article without applying any coating to the joined article.

A method and an assembly are described herein that enable temporarily mechanically holding a beam and node together prior to the addition of adhesive used for permanent bond. In other words, the method and assembly enable beams and nodes to be fixtured and datumed prior to final joining. The fixturing features may be provided as beam or node feature designs and in conjunction with the use of fasteners to lock and temporarily hold multiple components together until structural adhesive can be injected into an integrated cavity/void for a permanent bond between the components. Further, certain embodiments provide the ability to utilize pre-coated elements (anodized, powder coated, painted, etc.) in conjunction with a no-bake adhesive to eliminate the need for a paint shop, due to the strategic application of structural adhesive. Certain embodiments incorporate the use of flow path features that are integrated into the beams and nodes or into datuming elements to achieve the desired wet-out of the adhesive.

In some embodiments, a mechanical fastener is advanced through an aperture, and the application/injection of adhesive is performed through the same aperture. This design results in a robust joint that is both mechanically and adhesively secured. In such embodiments, adhesive ports in the mechanical fastener enable the injection of an adhesive from a nozzle of a tool, through the ports, and through the aperture to the interface between the beam and node. In certain embodiments, a mating tool is provided to advance the mechanical fastener for temporarily holding together the beam and node and to inject the adhesive into the interface between the beam and node. For example, the mechanical fastener may be placed on the tip of a handheld or automated tool. This tool would be available in many different tool head configurations (Allen/hex, triangle, square, etc.) to accommodate engineering or manufacturing requirements. As the fastener engages the standard, threaded component (beam or node), the fastener rotates into position and temporarily affixes of holds the beam and node together. The tool then injects a measured amount of adhesive through the integral ports in the fastener.

Thus, certain embodiments herein provide for a fixturing fastener that initially holds a beam and node together and subsequently doubles as an access port for flowing a structural adhesive, such as a premixed adhesive injection. The fastener may be incorporated with a selected keyway designs (hex, star, or the like) used for mechanically holding the beam and node together. This keyway configuration can be selected based on engineering or supplier requirements. Further, the fastener also includes an integral port or ports that provide a flow path for a viscous material such as structural adhesive to be flowed into a cavity at the interface between the beam and node. The ports may be engaged by a dedicated tool that includes ports in the tool tip. Thus, the tool may initially be used to mechanically adjust the position of the fastener, such as rotating a threaded fastener, to temporarily hold the beam and node in position relative to one another, and then be used to inject the adhesive to create a permanent bond between the beam and node. In certain embodiments, the beam or node is formed only with apertures that receive fasteners, and no apertures dedicated to flowing adhesive therethrough are needed.

In certain embodiments, the tool may provide multiple ports for adhesive injection. Exemplary ports may provide the ability to inject the adhesive at any interlocking position between the nozzle and keyway, without impairing adhesive flow. These ports enable the injection of adhesive into a void that is designed between these the two interfacing components, i.e., the beam and node. The void accommodates a pre-determined amount of adhesive that will permanently bond the two beam and node together upon curing.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for manufacturing, the method comprising:
   fitting together and datuming a beam and a node, wherein at least one of the beam or the node is formed with an aperture, and wherein a cylindrical interface is formed between the beam and node;
   advancing a mechanical fastener through the aperture to temporarily hold the beam and the node in an engagement; injecting a structural adhesive into the cylindrical interface between the beam and the node; and
   final joining the beam and the node by curing the structural adhesive,
   wherein a surface of at least one of the beam or the node is formed with a first flow path and a second flow path, wherein the structural adhesive is injected in the form of a two-part adhesive including a first part and a second part, and wherein the method includes flowing the first part through the first flow path and the second part through the second flow path to mix the first part and the second part, wherein the mechanical fastener is formed with a first port and a second port, and wherein the method includes flowing the first part through the first port and the second part through the second port.

2. The method of claim 1, wherein injecting the structural adhesive into the cylindrical interface between the beam and the node and curing the structural adhesive forms a cylindrical cured adhesive layer.

3. The method of claim 1, wherein one of the beam and the node is an outer member and another of the beam and the node is an inner member, wherein fitting together and datuming the beam and the node comprises fitting the inner member inside the outer member, and wherein the outer member is formed with the aperture.

4. The method of claim 1, wherein the aperture is a first aperture, wherein the at least one of the beam or the node is formed with a second aperture, and wherein injecting the structural adhesive into the cylindrical interface between the beam and the node comprises injecting the structural adhesive through the second aperture.

5. The method of claim 1, wherein final joining the beam and the node by curing the structural adhesive is performed at ambient temperature and forms a joined article, wherein the method further comprises:
   pre-coating the node and the beam before fitting together and datuming the node and the beam; and
   assembling a structure from the joined article without coating the joined article.

6. The method of claim 1, further comprising locating a high surface area substrate between the beam and node, wherein injecting the structural adhesive into the cylindrical interface between the beam and the node comprises flowing the structural adhesive into contact with the high surface area substrate, and wherein final joining the beam and the node by curing the structural adhesive comprises curing the structural adhesive around the high surface area substrate.

7. The method of claim 1, wherein a surface of the beam is formed with the first flow path and the second flow path.

8. The method of claim 1, wherein a surface of the node is formed with the first flow path and the second flow path.

9. The method of claim 1, wherein a surface of the beam is formed with the first flow path and a surface of the node is formed with the second flow path.

10. A method for manufacturing, the method comprising:
    fitting together and datuming a beam and a node, wherein at least one of the beam or the node is formed with an aperture, and wherein a cylindrical interface is formed between the beam and the node;
    fixturing the beam and the node with a mechanical fastener to temporarily hold the beam and the node in a desired orientation and position relative to one another;
    injecting a structural adhesive through the aperture into the cylindrical interface between the beam and the node; and
    final joining the beam and the node by curing the structural adhesive, wherein a surface of at least one of the beam or the node is formed with a first flow path and a second flow path, wherein the structural adhesive is injected in the form of a two-part adhesive including a first part and a second part, and wherein the method includes flowing the first part through the first flow path and the second part through the second flow path to mix the first part and the second part, wherein the mechanical fastener is formed with a first port and a second port, and wherein the method includes flowing the first part through the first port and the second part through the second port.

11. The method of claim 10, wherein injecting the structural adhesive into the cylindrical interface between the beam and the node and curing the structural adhesive forms a cylindrical cured adhesive layer.

12. The method of claim 10, wherein one of the beam and the node is an outer member and another of the beam and the node is an inner member, wherein fitting together and datuming the beam and the node comprises fitting the inner member inside the outer member, and wherein the outer member is formed with the aperture.

13. The method of claim 10, wherein final joining the beam and the node by curing the structural adhesive is performed at ambient temperature and forms a joined article, wherein the method further comprises:

pre-coating the node and the beam before fitting together and datuming the node and the beam; and assembling a structure from the joined article without coating the joined article.

14. The method of claim 10, further comprising locating a high surface area substrate between the beam and the node, wherein injecting the structural adhesive into the cylindrical interface between the beam and the node comprises flowing the structural adhesive into contact with the high surface area substrate, and wherein final joining the beam and the node by curing the structural adhesive comprises curing the structural adhesive around the high surface area substrate.

15. The method of claim 10, wherein a surface of the beam is formed with the first flow path and the second flow path.

16. The method of claim 10, wherein a surface of the node is formed with the first flow path and the second flow path.

17. The method of claim 10, wherein a surface of the beam is formed with the first flow path and a surface of the node is formed with the second flow path.

\* \* \* \* \*